(12) United States Patent
Zinke et al.

(10) Patent No.: US 6,325,737 B1
(45) Date of Patent: Dec. 4, 2001

(54) HELICAL GEAR DIFFERENTIAL WITH GEARED LUBE PUMP

(75) Inventors: James R. Zinke, Oxford; Garrett W. Gage, Goodrich, both of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/533,056

(22) Filed: Mar. 22, 2000

(51) Int. Cl.[7] .................................................. F16H 57/604
(52) U.S. Cl. ............................................ 475/160; 475/252
(58) Field of Search ..................................... 475/160, 252

(56) References Cited

U.S. PATENT DOCUMENTS

| | | |
|---|---|---|
| 3,776,067 | 12/1973 | DeBruyne et al. . |
| 4,560,056 | 12/1985 | Stockton . |
| 4,568,253 | 2/1986 | Wood . |
| 4,583,413 | 4/1986 | Lack . |
| 5,020,635 | 6/1991 | Lunn . |
| 5,244,440 | 9/1993 | Ichiki et al. . |
| 5,310,389 | 5/1994 | Sato . |
| 5,415,601 | 5/1995 | Cilano . |
| 5,472,383 | 12/1995 | McKibbin . |
| 5,554,081 | 9/1996 | Bowerman . |
| 5,556,351 | 9/1996 | Hiraishi et al. . |
| 5,643,126 | 7/1997 | Hotta et al. . |
| 5,669,844 | * 9/1997 | Homan et al. ..................... 475/160 |
| 5,711,737 | * 1/1998 | Teraoka et al. ..................... 475/160 |
| 5,735,765 | * 4/1998 | Teraoka et al. ..................... 475/248 |
| 5,785,624 | 7/1998 | Mayr . |
| 6,013,004 | * 1/2000 | Gage et al. ........................ 475/249 |
| 6,059,683 | * 5/2000 | Teraoka et al. ..................... 475/160 |

* cited by examiner

*Primary Examiner*—Dirk Wright
(74) *Attorney, Agent, or Firm*—Harness, Dickey & Pierce, P.L.C.

(57) ABSTRACT

A differential casing is provided which is rotatable about an axis. The differential casing is generally cylindrically shaped and defines a first end surface and a second end surface. A pair of side gears is disposed within the differential casing and is individually rotatable about the axis. At least one pair of pinion bores are also formed in the differential casing and extend substantially through the second end surface of the differential casing. Pinion gears are slidably and rotatably disposed in the pinion bores for transmitting power from the engine to the pair of side gears. The pinion gears have rotational axes that are fixed in relation to the differential casing and are engaged with the pair of side gears. Each pair of pinion gears further include a mutually meshing portion, which extends beyond the second end surface of the differential casing. Such arrangement enables a gear pumping effect, caused by rotation of the meshing pinion gears, to pump lubricant from outside the differential casing into the casing for improved wear protection and reduced heat and friction.

7 Claims, 4 Drawing Sheets

HELICAL GEAR DIFFERENTIAL WITH GEARED LUBE PUMP

FIELD OF THE INVENTION

The present invention relates to differentials for use in automotive drivelines and, more particularly, to a lubricating system for a helical gear differential.

BACKGROUND OF THE INVENTION

Differentials of the type used in automotive drivelines generally include a planetary gearset supported within a differential casing to facilitate relative rotation (i.e., speed differentiation) between a pair of output shafts. The planetary gearset typically includes helical side gears fixed to the end of the output shafts, which are meshed with paired sets of helical pinion gears. Each pair of pinion gears is disposed in pinion bores formed in the differential casing. Since the pinion bores are parallel to the rotary axis of the differential casing, the pinion gears rotate on axes parallel to the common axis of the output shafts and the side gears. This type of differential is known as a parallel gear type differential. In response to speed differentiation between the output shafts, the torque transmitted through meshed engagement of the side gears and pinion gears generates thrust forces. These thrust forces are exerted against the wall surface of the gear pockets and other thrust surfaces within the differential casing by the gear components to frictionally limit speed differentiation and proportion torque between the output shafts.

In order to reduce friction and provide wear protection between the pinion gears and other contacting surfaces of the differential system, various lubrication methods have been developed. One such method, as disclosed in U.S. Pat. No. 5,310,389, employs radial lubrication orifices disposed in the differential casing. The radial lubrication orifices are formed radially outward from the pinion gear meshing sections. Lubrication oil is then introduced through the radial orifices of the differential casing to the pinion gears to provide lubrication. However, due to the size of the lubrication holes, this method may not provide sufficient lubricant flow to the pinion gears. Alternatively, another lubrication method, as disclosed in U.S. Pat. No. 5,711,737, employs a plurality of lubrication holes formed in an end of the differential casing to introduce lubrication oil into the differential casing. Each lubrication hole is positioned so that its center is positioned near the pinion gear meshing point. In operation, lubrication oil is introduced through the lubrication hole and into the meshing portion of the pinion gears due to the gear pumping effect of the pinion gears. However, due to the restriction of hole size and position, it is expected that this method may not provide an optimal lubrication system.

Accordingly, there exists a need in the relevant art to provide a lubrication system for a helical gear differential capable of maximizing the gear pumping effect for improved wear protection and reduced friction of the differential system. Furthermore, there exists a need in the relevant art to provide a simplified and cost effective method of manufacturing differentials.

SUMMARY OF THE INVENTION

In accordance with the broad teachings of this invention, a helical gear differential having an advantageous construction is provided.

It is an object of the present invention to provide a lubrication system for a helical gear differential capable of maximizing the gear pumping effect for improved wear protection and reduced friction and heat, which is superior to conventional differential lubrication systems in terms of function and simplified manufacture.

According to a preferred embodiment of the present invention, a differential casing is provided which is rotatable about an axis. The differential casing is generally cylindrically shaped and defines a first end surface and a second end surface. A pair of side gears is disposed within the differential casing and is individually rotatable about the axis. At least one pair of pinion bores are also formed in the differential casing and extend substantially through the second end surface of the differential casing. Pinion gears are slidably and rotatably disposed in the pinion bores for transmitting power from the engine to the pair of side gears. The pinion gears have rotational axes that are fixed in relation to the differential casing and are engaged with the pair of side gears. Each pair of pinion gears further include a mutually meshing portion, which extends beyond the second end surface of the differential casing. Such arrangement enables a gear pumping effect, caused by rotation of the meshing pinion gears, to pump lubricant from outside the differential casing into the casing for improved wear protection and reduced heat and friction. Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. In particular, the present invention is directed to an improved differential assembly of the type used in motor vehicle drivetrain applications. The differential assembly of the present invention is designed to enable an end of the mutually meshing portions of the pinion gears to extend outside a differential casing. By extending this meshing portion outside the differential casing, a screw or gear pumping effect causes lubrication oil to be readily introduced into the differential casing, thereby providing improved wear protection and reduced heating and friction. The differential assembly of the present invention further enables improved manufacturing due to the simplified task of boring through the differential casing, rather than boring to a blind hole. This method further enable bore shaving to be readily expelled through the larger bore diameter, thereby simplifying manufacture. Thus, the differential assembly of the present invention may be utilized with a wide variety of applications and is not intended to be specifically limited to the particular application recited herein.

Figure 1:
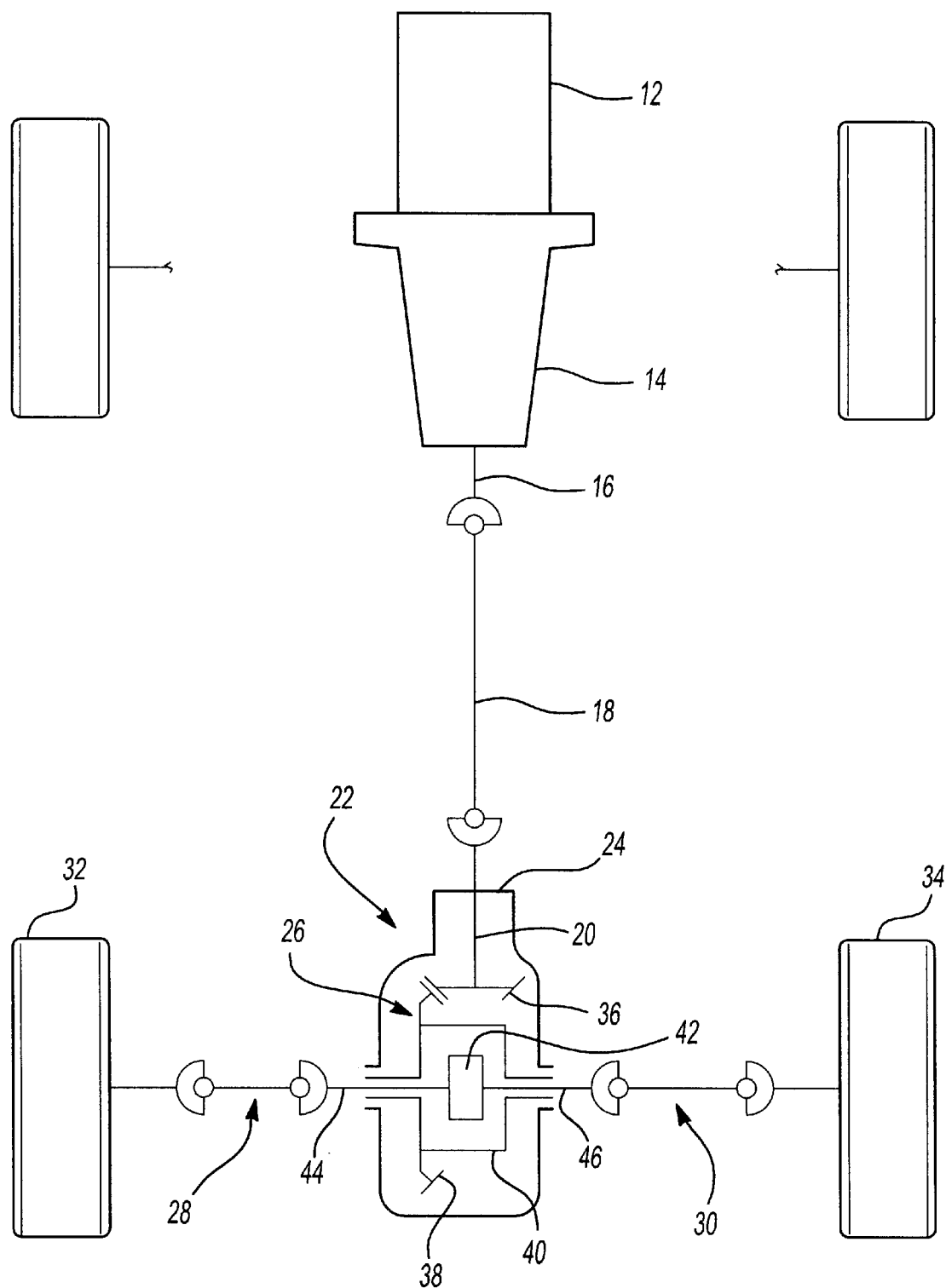
FIG. 1 is a schematic view of an exemplary motor vehicle drivetrain into which the differential assembly of the present invention is incorporated.

With particular reference now to FIG. 1, a drivetrain 10 for an exemplary motor vehicle is shown to include an engine 12, a transmission 14 having an output shaft 16, and a propeller shaft 18 connecting output shaft 16 to a pinion shaft 20 of a rear axle assembly 22. Rear axle assembly 22 includes an axle housing 24, a differential assembly 26 supported in axle housing 24, and a pair of axle shafts 28 and 30 respectively interconnected to left and right rear wheels 32 and 34. Pinion shaft 20 has a pinion shaft gear 36 fixed thereto which drives a ring gear 38 that is fixed to a differential casing 40 of differential assembly 26. A gearset 42 supported within differential casing 40 transfers rotary power from casing 40 to output shafts 44 and 46 connected to axle shafts 28 and 30, respectively, and facilitates relative rotation (i.e. differentiation) therebetween. While differential assembly 26 is shown in a rear-wheel drive application, the present invention is contemplated for use in differential assemblies installed in transaxles for use in front-wheel drive vehicles, and/or in transfer cases for use in four-wheel drive vehicles.

Figure 2:
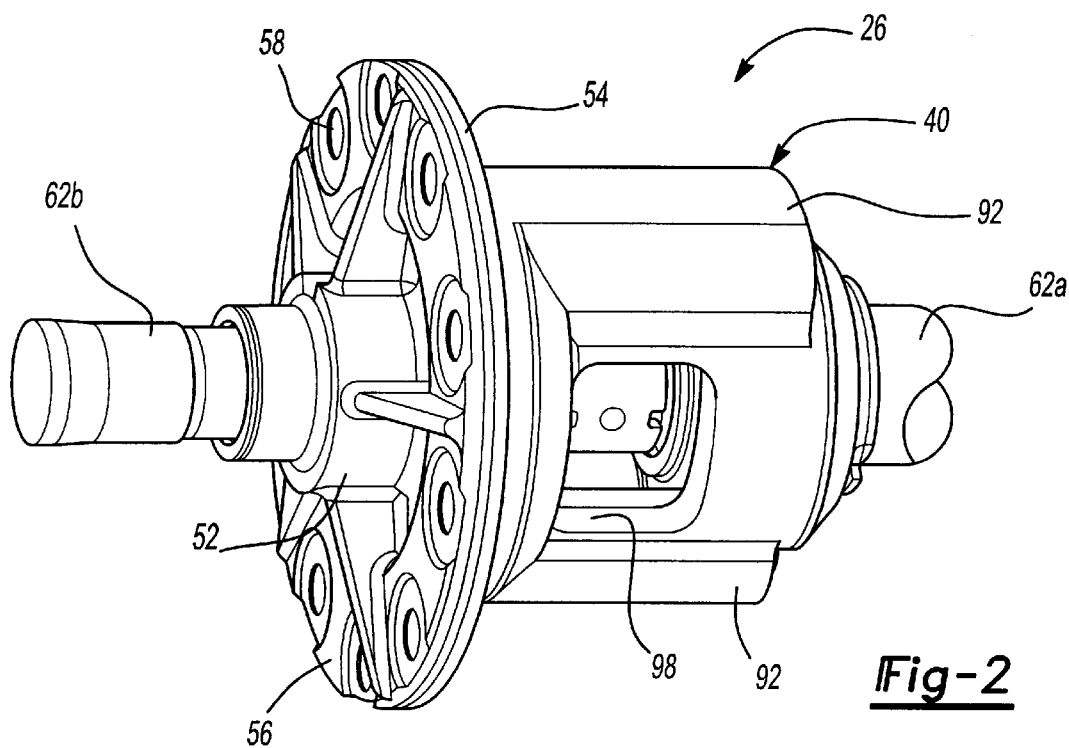
FIG. 2 is a perspective view of a differential assembly having the meshing portion of the pinion gears extending outside the differential casing according to the present invention.
Figure 3:
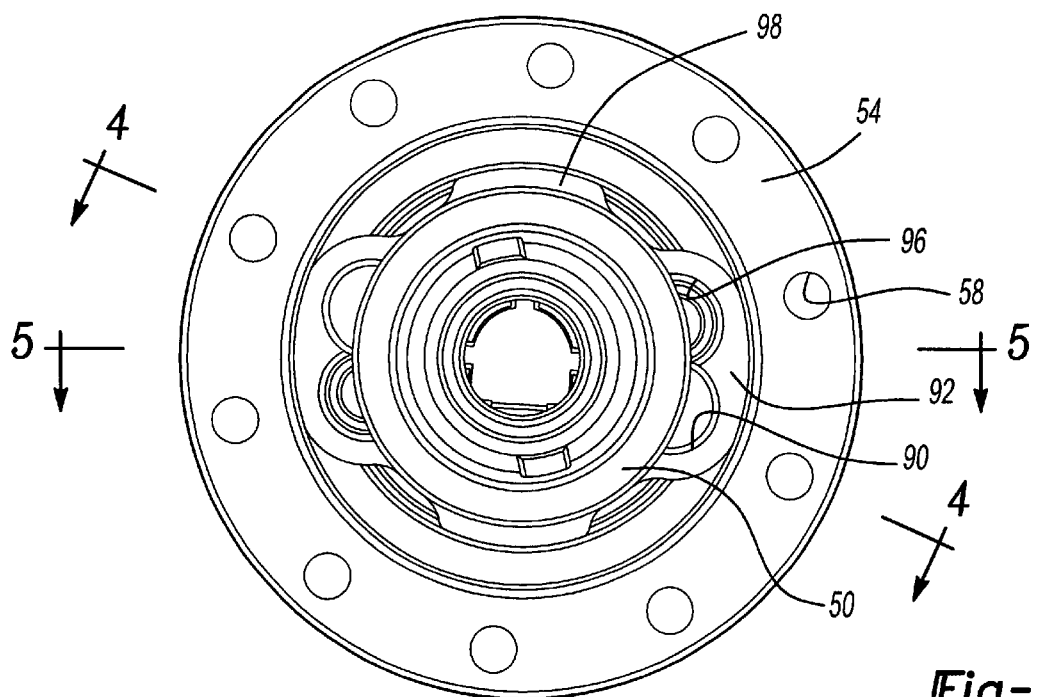
FIG. 3 is an end view of the differential assembly shown in FIG. 2.
Figure 4:
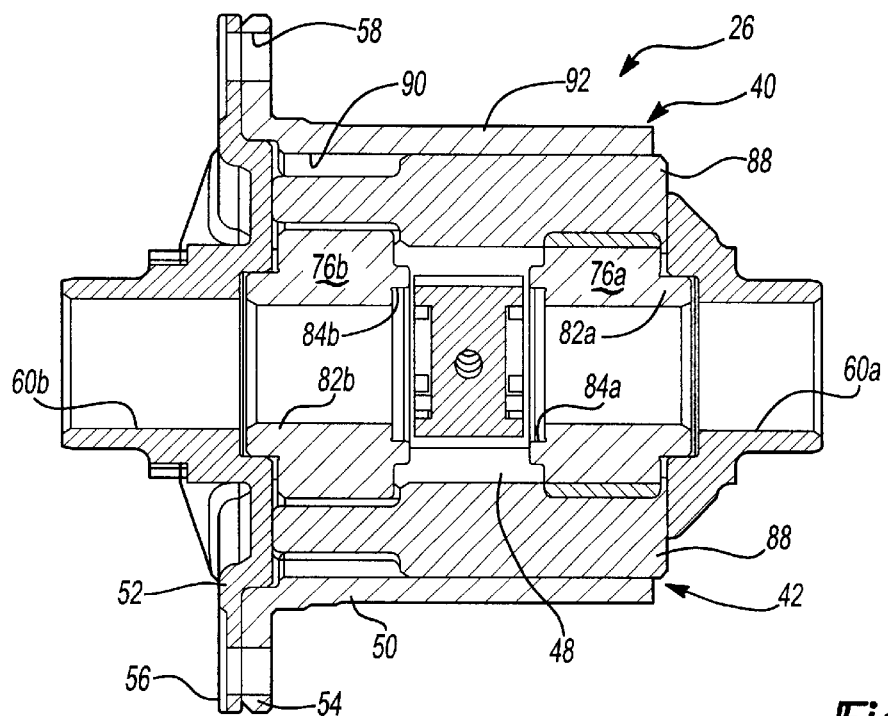
FIG. 4 is a sectional view taken generally along line 4—4 of FIG. 3 with the axle shaft removed.
Figure 5:
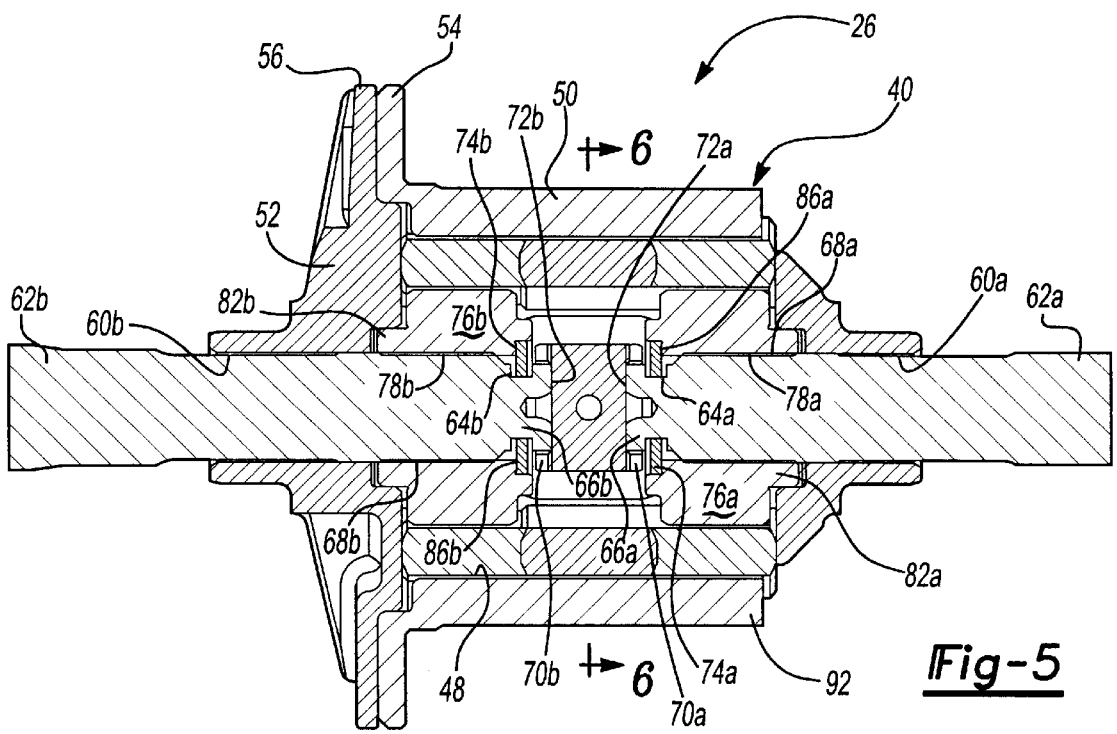
FIG. 5 is a sectional view taken generally along line 5—5 of FIG. 3.
Figure 6:
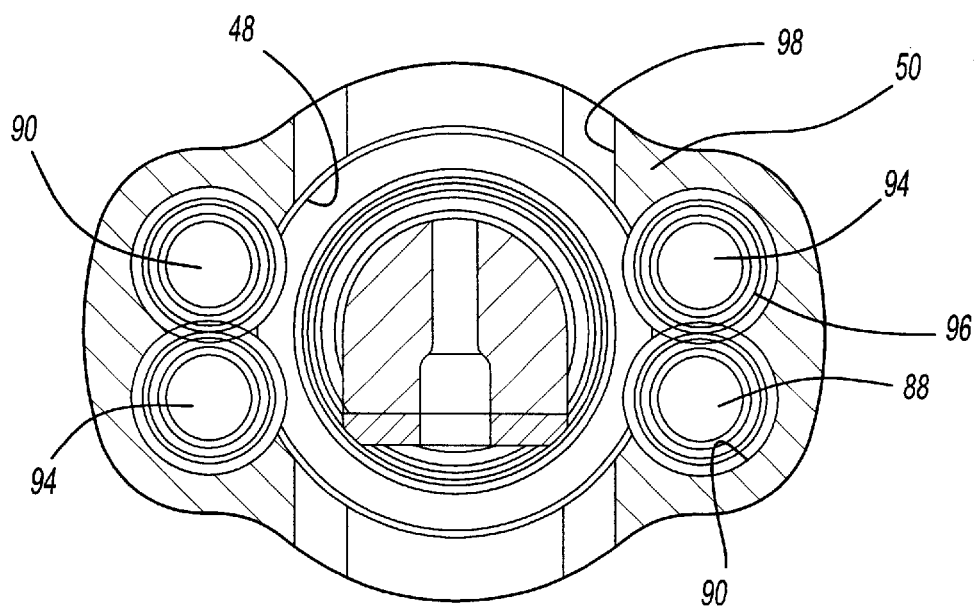
FIG. 6 is a sectional view taken generally along line 6—6 of FIG. 5.

Referring now to FIG. 2, the construction of differential assembly 26 is described in detail. Differential assembly 26 is a parallel-axle type and includes differential casing 40 defining an internal chamber 48 (FIG. 5). Differential casing 40 includes a main drum or body 50 and an end cap 52 having respective mating radial flanges 54, 56. Radial flanges 54, 56 are secured together by a plurality of bolts (not shown) extending through aligned mounting bores 58. As is known, a ring or bevel gear can be fixed to radial flange 54 on differential casing 40 to transfer rotary power (i.e., drive torque) thereto. Differential casing 40 defines a pair of axially aligned openings 60a, 60b (FIG. 5) in communication with internal chamber 48 (FIG. 5). Axially aligned openings 60a, 60b are adapted to receive and rotatably support the end segments of a pair of driving output shafts, hereinafter referred to as axle shafts 62a and 62b. The end segment of each axle shafts 62a, 62b includes a corresponding recessed annular groove 64a, 64b, which separates a button-like end pad 66a, 66b from an externally splined segment 68a, 68b. End pads 66a, 66b include a corresponding circular peripheral surface 70a, 70b, an outer face surface 72a, 72b, and an inner face surface 74a, 74b.

As described above, differential assembly 26 includes planetary gearset 42 that is operable for transferring drive torque from differential casing 40 to axle shafts 62a, 62b in a manner facilitating speed differential therebetween. Gearset 42 is a helical-type and is disposed in internal chamber 48. Gearset 42 includes a pair of side gears 76a, 76b. Side gears 76a, 76b have internal splines 78a, 78b meshes with external splines 68a, 68b on corresponding axle shaft 62a, 62b. In addition, side gears 76a, 76b include axial hubs 82a, 82b, which are retained in corresponding annular sockets, formed in main body 50 and end cap 52 of differential casing 40, and annular chambers 84a, 84b. C-shaped retainer springs, or C-clips 86a, 86b, are retained in annular grooves 64a, 64b and chambers 84a, 84b for axially positioning and restraining side gears 76a, 76b between end wall surfaces of differential casing 40 and end pads 66a, 66b on axle shafts 62a, 62b. Gearset 42 also includes a series of first pinion gears 88 rotatably supported in pinion bores 90. Pinion bores 90 are formed in raised hub segments 92 of main body 50. Similarly, a series of second pinion gears 94 are rotatably supported in pinion bores 96. Pinion bores 96, like pinion bores 90, are formed in raised hub segments 92 of main body 50. Pinion bores 90 and 96 are arranged in paired sets such that they communicate with each other and with internal chamber 48. In addition, pinion bores 90 and 96 are aligned substantially parallel to the rotational axis of axle shafts 62a, 62b. When assembled, first pinion gears 88 mesh with side gear 76a (FIG. 5), while second pinion gears 94 mesh with side gear 76b. Additionally, the paired sets are arranged such that one of first pinion gears 88 also meshes with one of second pinion gears 94. Windows 98 are formed in main body 50 between hub segments 92 and are provided for permitting access to the gearset within internal chamber 48.

In accordance with the present invention, first 88 and second 94 pinion gears extend beyond an end surface 100 of main body 50. Such arrangement enables a screw or gear pumping effect, caused by rotation of the meshing pinion gears 88, 94, to pump lubricant from outside differential casing 40 into casing 40 for improved wear protection and reduced heat and friction.

Figure 7:
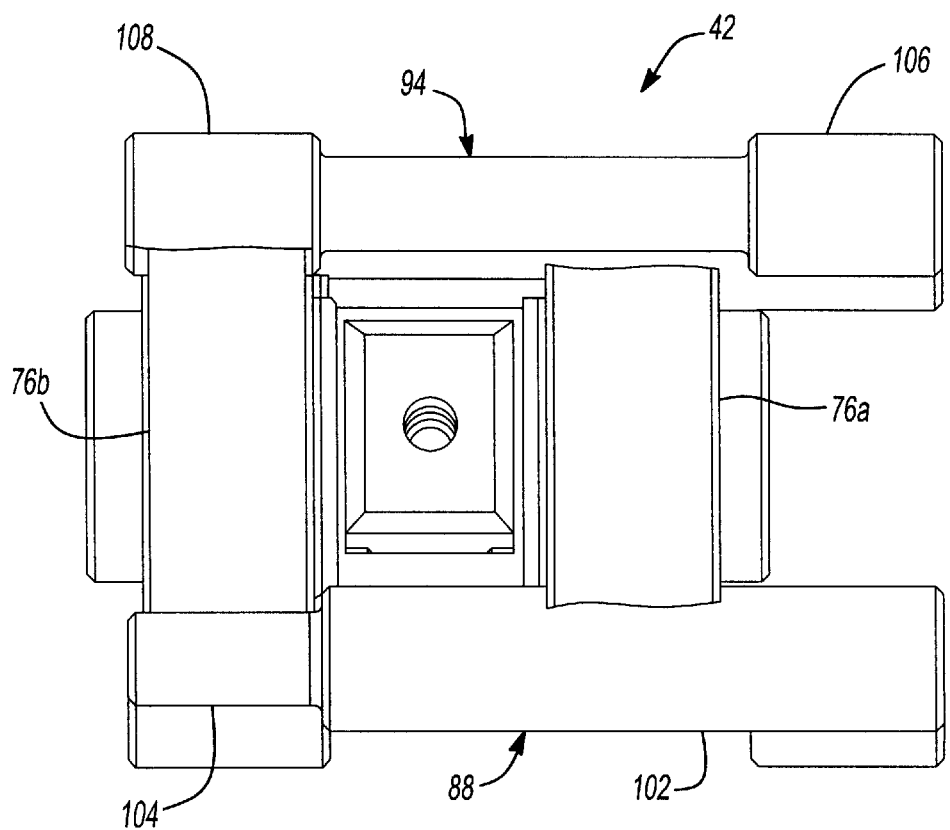
FIG. 7 is a side view of the gearset according to the present invention.

As best seen in FIG. 7, first pinion gear 88 includes a meshing portion 102 and a post portion 104 such that first pinion gear 88 is not meshed with second side gear 76b. However, meshing portion 102 of first pinion gear 88 is meshed with first side gear 76a. Similarly, second pinion gear 94 includes opposing meshing portions 106, 108 having a post portion 110 extending therebetween. Post portion 110 of second pinion gear 94 prevents second pinion gear 94 from meshing with first side gear 76a. However, meshing portion 108 of second pinion gear 94 is meshed with second side gear 76b. Each pair of pinion gears 88, 94 are mutually meshed together. In particular, meshing portion 102 of first pinion gear 88 meshes with meshing portion 106 of second pinion gear 94. It should be appreciated that meshing portion 106 of second pinion gear 94 extends beyond first side gear 76a to prevent meshing of second pinion gear 94 with first side gear 76a. This arrangement further enables meshing portions 102, 106 to extend beyond first side gear 76a and, in particular, extend beyond end surface 100 of main body 50 and into an lubricating oil bath disposed in the axle sump (not shown). Consequently, improved lubrication and reduced heat and friction are realized.

In operation, rotary power from engine 12 is transmitted to differential casing 40 through transmission 14, propeller shaft 18, pinion shaft 20, and pinion shaft gear 36. Rotary power is then distributed from differential casing 40 to axle shafts 28, 30 through gearset 42. In particular, rotary power is transferred from differential casing 40 to side gears 76a, 76b through pinion gears 88, 94. When a difference is driving resistance occurs between axle shafts 28 and 30, rotary power from engine 12 is distributed differentially between axle shafts 28 and 30 by pinion gears 88, 94. Due to rotation of pinion gears 88, 94 during operation of differential assembly 26, a screw or gear pumping effect is induced. The gear pumping effect, as used herein, is defined as the positive pumping condition caused by the rotation of adjacent gear component. This rotation produces a decrease in pressure between the gear components, which produces a pumping action.

Thus, by extending the mutually meshing portions 102, 106 of pinion gears 88, 94, respectively, into the lubrication oil bath of the axle sump (not shown), the gear pumping effect is maximized. Once lubrication oil is introduced between pinion gears 88, 94 by the gear pumping effect, the lubrication oil is then readily pumped through differential casing 40 by the gear pumping effect and/or centrifugal force. Therefore, iT should be appreciated that by disposing the meshing portions of the pinion gears within the lubrication oil bath an improved pumping action may be realized. This improved pumping action, which enables improved lubrication of the differential assembly, is believed to improve wear protection and reduce heat and friction in the differential assembly 26.

Moreover, the present invention has the advantage of providing a simplified and cost effective method of manufacture. Traditionally, pinion bores or pockets, such as pinion bores 90, 96 of the present invention, were formed by machining to a blind hole. However, by allowing pinion bores 90, 96 to be formed through end surface 100 of main body 50 as in the present invention, machining of main body 50 is simplified and manufacturing costs are decreased. Furthermore, machining waste such as chips and metal shavings, which are produced during the machining of main body 50, may be conveniently expelled through pinion bores 90, 96, thereby further simplifying the machining of main body 50 and decreasing the manufacturing costs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A differential assembly for a vehicle, said differential assembly comprising:

a differential casing rotatable about an axis, said differential casing being generally cylindrical and defining a first end surface and a second end surface;

a pair of side gears disposed within said differential casing, said pair of side gears being individually rotatable about said axis;

at least one pair of pinion bores formed in said differential casing, said at least one pair of pinion bores extending substantially through said second end surface of said differential casing; and pinion gears slidably and rotatably disposed in said at least one pair of pinion bores for transmitting power from an engine to said pair of side gears, said pinion gears having rotational axes fixed in relation to said differential casing and engaging said pair of side gears, each pair of said pinion gears further having a mutually-meshing portion extending beyond said second end surface of said differential casing whereby a gear pumping effect caused by rotation of said meshing pinion gears pumps lubricant from outside said differential casing to introduce said lubricant into said differential casing.

2. The assembly according to claim 1, further comprising:

a pair of output shafts rotatably secured to said side gears, said pair of output shafts being rotatably aligned to said axis and extending through said first and second end surfaces of said differential casing.

3. The assembly according to claim 1 wherein said pinion gears include a first pinion gear meshed with one of said side gears and a second pinion gear meshed with the other of said side gears.

4. The assembly according to claim 1 wherein said at least one pair of pinion bores is parallel to said axis.

5. A drivetrain for a motor vehicle, said motor vehicle having an engine and a transmission for providing power to a power output shaft, said drivetrain comprising:

an axle assembly having an axle housing;

a differential assembly operably disposed in said axle housing, said differential assembly having a differential casing rotatable about an axis for receiving power from the power output shaft, said differential casing being generally cylindrical and defining a first end surface and a second end surface;

a pair of side gears disposed within said differential casing, said pair of side gears being individually rotatable about said axis;

a pair of driving output shafts rotatably secured to said side gears, said pair of output shafts being rotatably aligned to said axis and extending through said first and second end surfaces of said differential casing;

at least one pair pinion bores formed in said differential casing, said at least one pair of pinion bores extending substantially through said second end surface of said differential casing; and pinion gears slidably and rotatably disposed in said at least one pair of pinion bores for transmitting power from an engine to said pair of side gears, said pinion gears having rotational axes fixes in relation to said differential casing and engaging said pair of side gears, each pair of said pinion gears further having a mutually-meshing portion extending beyond said second end surface of said differential casing whereby a gear pumping effect by rotation of said meshing pinion gears pumps lubricant directly from outside said differential casing to introduce said lubricant into said differential casing.

6. The drivetrain according to claim 5 wherein said pinion gears include a first pinion gear meshed with one of said side gears and a second pinion gear meshed with the other of said side gears.

7. The drivetrain according to claim 5 wherein said at least one pair of pinion bores is parallel to said axis.

* * * * *

UNITED STATES PATENT AND TRADEMARK OFFICE
CERTIFICATE OF CORRECTION

PATENT NO. : 6,325,737 B1  
DATED : December 4, 2001  
INVENTOR(S) : James R. Zinke, II and Garrett W. Gage It is certified that error appears in the above-identified patent and that said Letters Patent is hereby corrected as shown below:

<u>Title page,</u>  
Item [75], Inventors, "James R. Zinke" should be -- James R. Zinke, II --.

<u>Column 3,</u>  
Line 63, "meshes" should be -- meshing --.

<u>Column 4,</u>  
Line 48, "an" should be -- a --.  
Line 57, "is" should be -- in --.

<u>Column 5,</u>  
Line 8, "iT" should be -- it --.

<u>Column 6,</u>  
Line 33, after "pair" insert -- of --.  
Line 40, "fixes" should be -- fixed --.

Signed and Sealed this

Fifth Day of November, 2002

Attest:

Attesting Officer

JAMES E. ROGAN  
*Director of the United States Patent and Trademark Office*